(12) United States Patent
Sekhar (10) Patent No.: US 12,261,829 B2
(45) Date of Patent: Mar. 25, 2025

(54) SYSTEM AND METHOD FOR SECURE TRANSFER OF COMPLETELY ENCRYPTED DATA AT WIRE SPEEDS

(71) Applicant: Pantherun Technologies Private Limited, Karnataka (IN)

(72) Inventor: Srinivas Lakshman Sekhar, Karnataka (IN)

(73) Assignee: PANTHERUN TECHNOLOGIES PRIVATE LIMITED, Karnata (IN)

( * ) Notice: Subject to any disclaimer, the term of this patent is extended or adjusted under 35 U.S.C. 154(b) by 367 days.

(21) Appl. No.: 17/695,177

(22) Filed: Mar. 15, 2022

(65) Prior Publication Data

US 2023/0127007 A1 Apr. 27, 2023

(30) Foreign Application Priority Data

Oct. 26, 2021 (IN) .............................. 202141048923

(51) Int. Cl.
*G06F 21/00* (2013.01)
*H04L 9/40* (2022.01)

(52) U.S. Cl.
CPC ................................ *H04L 63/0428* (2013.01)

(58) Field of Classification Search
CPC ................................................. H04L 63/0428
See application file for complete search history.

(56) References Cited

U.S. PATENT DOCUMENTS

| | | | | |
|---|---|---|---|---|
| 6,870,930 B1 * | 3/2005 | Kim | ..................... | H04L 9/0844 348/E7.071 |
| 9,742,742 B1 * | 8/2017 | Monk | ................... | H04L 9/3263 |
| 11,582,022 B1 * | 2/2023 | Creek | .................. | H04L 9/0637 |
| 2004/0103279 A1 * | 5/2004 | Alten | .................... | H04L 63/062 713/160 |
| 2007/0198828 A1 * | 8/2007 | Gonsalves | .......... | H04L 43/0882 713/153 |
| 2007/0283170 A1 * | 12/2007 | Yami | ..................... | H04L 9/0866 713/193 |
| 2018/0041477 A1 * | 2/2018 | Shaposhnik | ............ | G06F 21/53 |
| 2019/0238334 A1 * | 8/2019 | Nakamura | ............ | G06F 21/606 |
| 2022/0398332 A1 * | 12/2022 | Nelson | .................. | G06F 21/602 |

* cited by examiner

*Primary Examiner* — Michael M Lee
(74) *Attorney, Agent, or Firm* — Tucker Ellis LLP (57) ABSTRACT

A system and method for secure transfer of information facilitating transmission of completely encrypted data at wire speeds to/from one or more destinations is associated with authorized one or more users through one or more communication networks. The encrypted information contains a message configured to be concealed from unauthorized access and a decrypting key configured to retrieve the message from the encrypted information, the decrypting key being randomly placed in the encrypted information. The decrypting key accommodated in the encrypted information transmitted at a first time instant is configured to decrypt the message extracted from the encrypted information at a second time instant, the first time instant being followed by the second time instant. The encrypted information pertains to L2 and L3 communication protocols pertaining to standard TCP/IP format, the exchange of encrypted information being facilitated through one or more parallel communication interfaces.

7 Claims, 10 Drawing Sheets

SYSTEM AND METHOD FOR SECURE TRANSFER OF COMPLETELY ENCRYPTED DATA AT WIRE SPEEDS

RELATED APPLICATION DATA

This application claims priority to and the benefit of Indian application number IN 202141048923, with a filing date of Oct. 26, 2021, the entirety of which is incorporated by reference herein.

TECHNICAL FIELD

The present disclosure relates to the field of information security or cyber security. In particular, the present disclosure provides a system and method for secure data exchange by completely encrypting data at wire speeds.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Security of transferred information has been traditionally handled by encrypting sensitive information using cryptography that included generation of a decrypting key that is transmitted along with the encrypted information, the decrypting key being configured to retrieve the unencrypted message from the encrypted information. However, this introduced time delay in communication and the decrypting key could be easily located and extracted by unauthorized users due to change in format of the transmitted encrypted data packet. Hence there is need in the art to provide a system and method for transfer of encrypted information that can be applied at wire speed and the encryption can be done without changing the packet format, thus the only foolproof way to prevent cyber-attacks.

Existing literature describes a safe internet protocol pertaining to generation of random decrypting key based on exclusive-or functions. A low latency block cipher encryption is discussed by another prior-art. A method for hiding a digital message using artificial intelligence based on specific target environment attributes have been described by another literature. However the disclosed methods use structure of encrypted data packet that is different from standard TCP/IP and hence are easily identifiable for cyber-attacks. These methods do not support L2/L3 layer communication and VPN. Random decrypting key necessitates changes in hardware and application program due to acknowledgment signals and are therefore hardware specific. Therefore, there is need in the art to develop a system and method that is indistinguishable from unencrypted TCP/IP information packets, can handle lowest osi (Open Systems Interconnection) layer communication and is fast and leaves no traces that can be used to decrypt the data by unauthorised agencies.

The proposed system and method use format of standard TCP/IP data packets similar to unencrypted information and the entire message including header is encrypted. The encrypted information contains the decrypting key, configured to be placed at one or more predetermined locations inside one or more encrypted data packets, the predetermined locations being generated at random by an AI enabled random number generator. The proposed method is enabled to handle information pertaining to L2/L3 layers of communication. The decrypting key corresponding to an encrypted message is transmitted as part of a one or more previous encrypted messages. The proposed method does not require acknowledgment signals, changes in hardware, network and application program and does not involve any time delay.

OBJECTS OF THE PRESENT DISCLOSURE

Some of the objects of the present disclosure, which at least one embodiment herein satisfies are as listed herein below.

It is an object of the present disclosure to provide a system and method that enables secure transfer of completely encrypted data at wire speeds including a header by a processing unit (also interchangeably referred to as a Source device or simply as Source hereinafter).

It is an object of the present disclosure to provide a system and method for secure transfer of completely encrypted data at wire speeds that communicatively couples the processing unit to one or more user devices or servers, hereinafter interchangeably also referred to as Destination devices or simply as Destinations, through one or more communication networks.

It is an object of the present disclosure to provide a system and method for secure transfer of completely encrypted data at wire speeds that enables the Source to transmit and receive the completely encrypted information at predetermined speed to and from one or more Destinations associated with authorized one or more users.

It is an object of the present disclosure to provide a system and method for secure transfer of completely encrypted data at wire speeds that enables the Source to accommodate the a decryption key in the encrypted information, the decrypting key being configured to decipher the encrypted message.

It is an object of the present disclosure to provide a system and method for secure transfer of completely encrypted data at wire speeds that enables the Source/processing unit to randomly assign one or more predetermined locations in the encrypted message for accommodating the decrypting key.

It is an object of the present disclosure to provide a system and method for secure transfer of completely encrypted data at wire speeds that enables the Source to configure the encrypted message in standard TCP/IP format corresponding to L2/L3 layers of open system interconnection, the structure/format of encrypted information being indistinguishable from unencrypted information.

It is an object of the present disclosure to provide a system and method for secure transfer of completely encrypted data at wire speeds that enables the Source to bi-directionally exchange encrypted information with the one or more communication networks (104) through any or a combination of serial and parallel interfaces.

SUMMARY

The present disclosure relates to the field of information security or Cyber security. In particular, the present disclosure provides a system and method for secure transfer of completely encrypted data at wire speeds.

An aspect of the present disclosure is to provide a system that enables generation of completely encrypted information including a message and header.

In an aspect, the system may include a Source/processing unit communicatively coupled to one or more Destinations/ user devices associated with one or more users through one or more communication networks.

In an aspect the Source/processing unit may be configured to generate the encrypted information and correspondingly transmit the encrypted information at predetermined speed to the authorized one or more Destinations/user devices through any or a combination of serial and parallel interfaces.

In an aspect the Source may be enabled to accommodate a decryption key in the encrypted information, the decrypting key being configured to decipher the encrypted message.

In an aspect the Source may be configured to randomly assign one or more predetermined locations in the encrypted message for accommodating the decrypting key, assignment of the predetermined locations pertaining to one or more time instants and the one or more Destinations.

In an aspect the encrypted message may be configured pertaining to standard TCP/IP format corresponding to L2/L3 layers of open system interconnection, the structure of encrypted information being indistinguishable from unencrypted information.

In an aspect the Source may be configured to bi-directionally exchange encrypted information with the one or more communication networks (104) through any or a combination of serial and parallel interfaces.

An aspect of the present disclosure is to provide a method that may enable generation of a completely encrypted information, the encrypted information pertaining to standard TCP/IP format structurally similar to unencrypted information.

In an aspect the method may enable an AI engine to accommodate a decrypting key configured to decipher the transmitted encrypted information, the decrypting key being located at random locations within the transmitted encrypted information.

In an aspect, a decrypting key accommodated in the encrypted information transmitted at a first time instant may correspond to an encrypted message transmitted as part of encrypted information in a second time instant, the first time instant being followed by the second time instant.

In an aspect, a decrypting key accommodated in the encrypted information received at a third time instant may correspond to an encrypted message transmitted as part of encrypted information in a fourth time instant, the third time instant being followed by the fifth time instant.

BRIEF DESCRIPTION OF THE ACCOMPANYING DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams described herein are for illustration only, which thus are not limitations of the present disclosure, and wherein.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

While embodiments of the present invention have been illustrated and described in the accompanying drawings, the embodiments are offered only in as much detail as to clearly communicate the disclosure and are not intended to limit the numerous equivalents, changes, variations, substitutions and modifications falling within the spirit and scope of the present disclosure as defined by the appended claims.

The present disclosure relates to the field of information security or Cyber security. In particular, the present disclosure provides a system and method for secure transfer of completely encrypted data at wire speeds.

Figure 1:
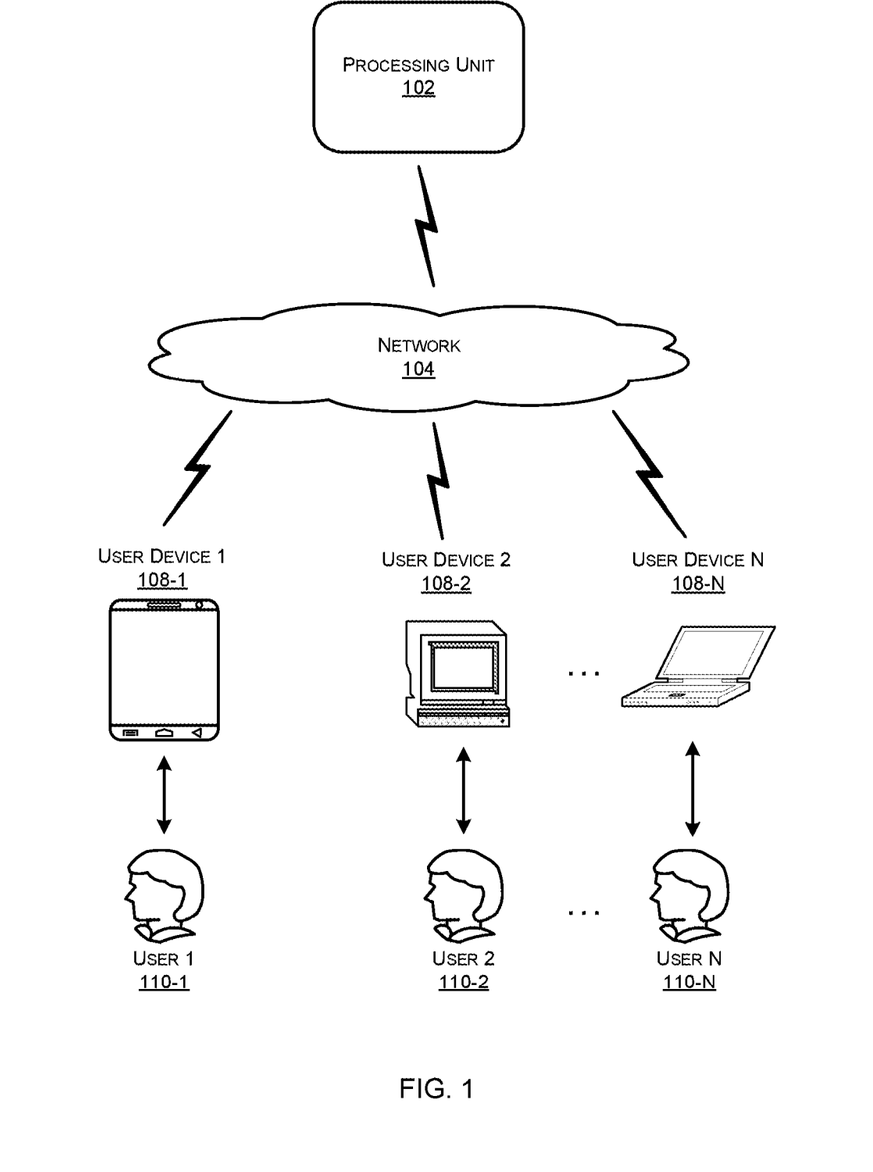
FIG. 1 illustrates network architecture (100) of the proposed system for secure transfer of completely encrypted data at wire speeds, to elaborate upon its working in accordance with an embodiment of the present disclosure.

FIG. 1 illustrates network architecture (100) of the proposed system for secure transfer of completely encrypted data at wire speeds, to elaborate upon its working in accordance with an embodiment of the present disclosure.

In an embodiment, the proposed system (100) includes a Source/processing unit (102) coupled to one or more Destinations/user device (108-1, 108-2, . . . , 108-N) (collectively known as Destinations (108) and individually known as Destination (108)) associated with one or more users (110-1, 100-2, . . . , 110-N) (collectively known as users (110) and individually known as user (110)) through one or more communication network (104). The Source (102) may be enabled to generate from a first set of data packets pertaining to digital message, a completely encrypted information that may be transmitted to the authorized one or more Destinations (108). In an alternate exemplary embodiment, the proposed system may optionally further include one or more servers. The Source (102) may be further enabled to receive completely encrypted information from the one or more Destinations (108). Decryption of the received completely encrypted information and retrieval of an original message may be performed at the Source (102). The completely encrypted information may be transferred bi-directionally through the one or more communication networks (104).

In an embodiment, the one or more Destinations (108) may include any or a combination of smart phones, mobiles, laptops, computers, computing devices, smart camera, a personal digital assistant, a handheld device and the likes.

In an embodiment, the one or more communication network (104) may be a wireless network, a wired network or a combination thereof that can be implemented as one of the different types of networks, such as Intranet, Local Area Network (LAN), Wide Area Network (WAN), Internet, and the like. Further, the one or more communication network (104) may either be a dedicated network or a shared network. The shared network may represent an association of the different types of networks that may use variety of protocols, for example, Hypertext Transfer Protocol (HTTP), Transmission Control Protocol/Internet Protocol (TCP/IP), Wireless Application Protocol (WAP), and the like.

Figure 2:
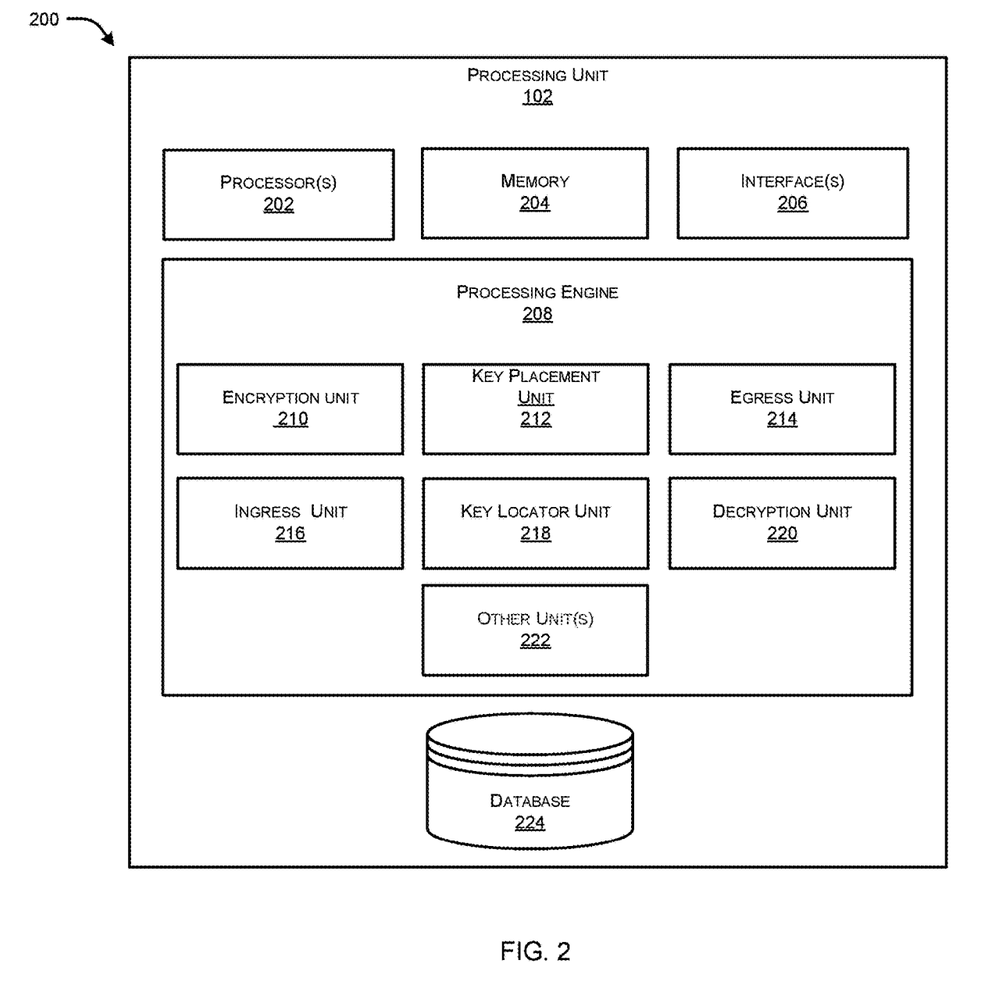
FIG. 2 illustrates exemplary functional components (200) of a Source (102) of the proposed system (100) for secure transfer of completely encrypted data at wire speeds, in accordance with an embodiment of the present disclosure.

FIG. 2 illustrates exemplary functional components (200) of a Source (102) of the proposed system (100) for secure transfer of completely encrypted data at wire speeds, in accordance with an embodiment of the present disclosure.

As illustrated in an embodiment, the Source (102) may include one or more processor(s) (202). The one or more processor(s) (202) may be implemented as one or more microprocessors, microcomputers, microcontrollers, digital signal processors, central Sources, logic circuitries, and/or any devices that manipulate data based on operational instructions. Among other capabilities, the one or more processor(s) (202) may be configured to fetch and execute computer-readable instructions stored in a memory (204) of the Source (102). The memory (204) may store one or more computer-readable instructions or routines, which may be fetched and executed to create or share the data units over a network service. The memory (204) may include any non-transitory storage device including, for example, volatile memory such as RAM, or non-volatile memory such as EPROM, flash memory, and the like.

In an embodiment, the Source (102) may also include an interface(s) (206). The interface(s) (206) may include a variety of interfaces, for example, interfaces for data input and output devices, referred to as I/O devices, storage devices, and the like. The interface(s) (206) may facilitate communication of the Source (102) with various devices including but not limited to networking hardware, printer, display units, portable mass storage devices, computing devices and the likes coupled to the Source (102). The interface(s) (206) may also provide a communication pathway for one or more components of Source (102). Examples of such components include, but are not limited to, processing engine(s) (208), memory (204) and database (222).

In an embodiment, the processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may include a processing resource (for example, one or more processors), to execute such instructions. In the present examples, the machine-readable storage medium may store instructions that, when executed by the processing resource, implement the processing engine(s) (208). In such examples, the Source (102) can include the machine-readable storage medium storing the instructions and the processing resource to execute the instructions, or the machine-readable storage medium may be separate but accessible to Source (102) and the processing resource. In an embodiment, the processing engine may be implemented as an Artificial Intelligent engine. In other examples, the processing engine(s) (208) may be implemented by electronic circuitry. A database (222) may include information that is either stored or generated as a result of functionalities implemented by any of the components of the processing engine(s) (208).

In an embodiment, the processing engine (208) may include an encryption unit (210) that may be configured to receive, a first set of data packets pertaining to digital information, the digital information containing message configured to be securely transmitted by the one or more processors (202) to the one or more Destinations (108) and one or more servers (106). The one or more processors (202) may be configured to generate a second set of data packets from the received first set of data packets, the second set of data packets being in encrypted form and indistinguishable from unencrypted information in structure and format of standard TCP/IP. The second set of data packets may pertain to computer readable binary stream.

In an embodiment, the processing engine (208) may include a key placement unit (212) that may be configured to generate a third or more set of data packets, which being configured to decrypt the second set of data packet. Decryption of the second set of data packets using the third or more set of data packets may be performed by authorized one or more Destinations (108). The one or more processors (202) may be enabled to generate, a fourth set of data packets pertaining to transmitted encrypted information. The fourth or more set of data packets may be configured to accommodate the keys to the third set of data packets and the second set of data packets. In an embodiment, the key to the third set of data packets may be placed at one or more predetermined locations in the fourth or more set of data packets at one or more time instants. The one or more predetermined locations may be randomly selected based on the recipient pertaining to the one or more Destinations (108) and the one or more time instants. By way of example, the third or more set of data packets transmitted may be configured to decrypt the second set of data packets transmitted at a second time instant, the first time instant being followed by the second time instant.

In an embodiment, the processing engine (208) may include an egress unit (214) that may be configured to transmit the fourth set of data packets to the one or more communication network (104), the one or more communication network (104) being configured to channelize the fourth set of data packets to predetermined one or more Destinations (108) without time delay. By way of example, the fourth set of data packets may be transmitted at 9.6 Kbps to 10 Gbps. The transmission may not undergo drop in speed and throughput may exceed 93-96%, which may be considered wire speed.

In an embodiment, the processing engine (208) may include an ingress unit (216) that may be configured to receive a fifth set of data packets pertaining to completely encrypted information from the one or more Destinations (108) through the one or more communication network (104). The fifth set of data packets may correspond to one or more time instants. By way of example the fifth set of data packets may be computer readable binary stream compatible with L2/L3 layer of standard TCP/IP communication.

In an embodiment, the processing engine (208) may include a key locator unit (218) that may be enabled to locate and extract a sixth and a seventh set of data packets from the received fifth or more set of data packets. In an exemplary embodiment, the fifth or more set of data packets may be received at a third time instant onwards. The seventh set of data packets may pertain to the encrypted message and the sixth set of data packets may pertain to the decrypting key corresponding to the seventh set of data packets extracted at a fourth time instant. The third time instant may be followed by the fourth time instant.

In an embodiment, the processing engine (208) may include a decryption unit (220) that may be configured to decrypt the seventh set of data packets extracted at the fourth time instant by the sixth or more set of data packets extracted at the third time instant and correspondingly generate an eighth set of data packets. The eighth set of data packets may pertain to deciphered original message transmitted by the authorized one or more Destinations (108). The one or more processors (202) may be configured to transmit the eighth set of data packets to a database coupled to the one or more processor (202). By way of example, the eighth set of data packets may pertain to standard TCP/IP format.

FIG. 3A-E illustrate exemplary flow diagram (300) of the Source of the proposed system (100) for secure transfer of completely encrypted data at wire speeds, in accordance with an embodiment of the present disclosure.

Figure 3A:
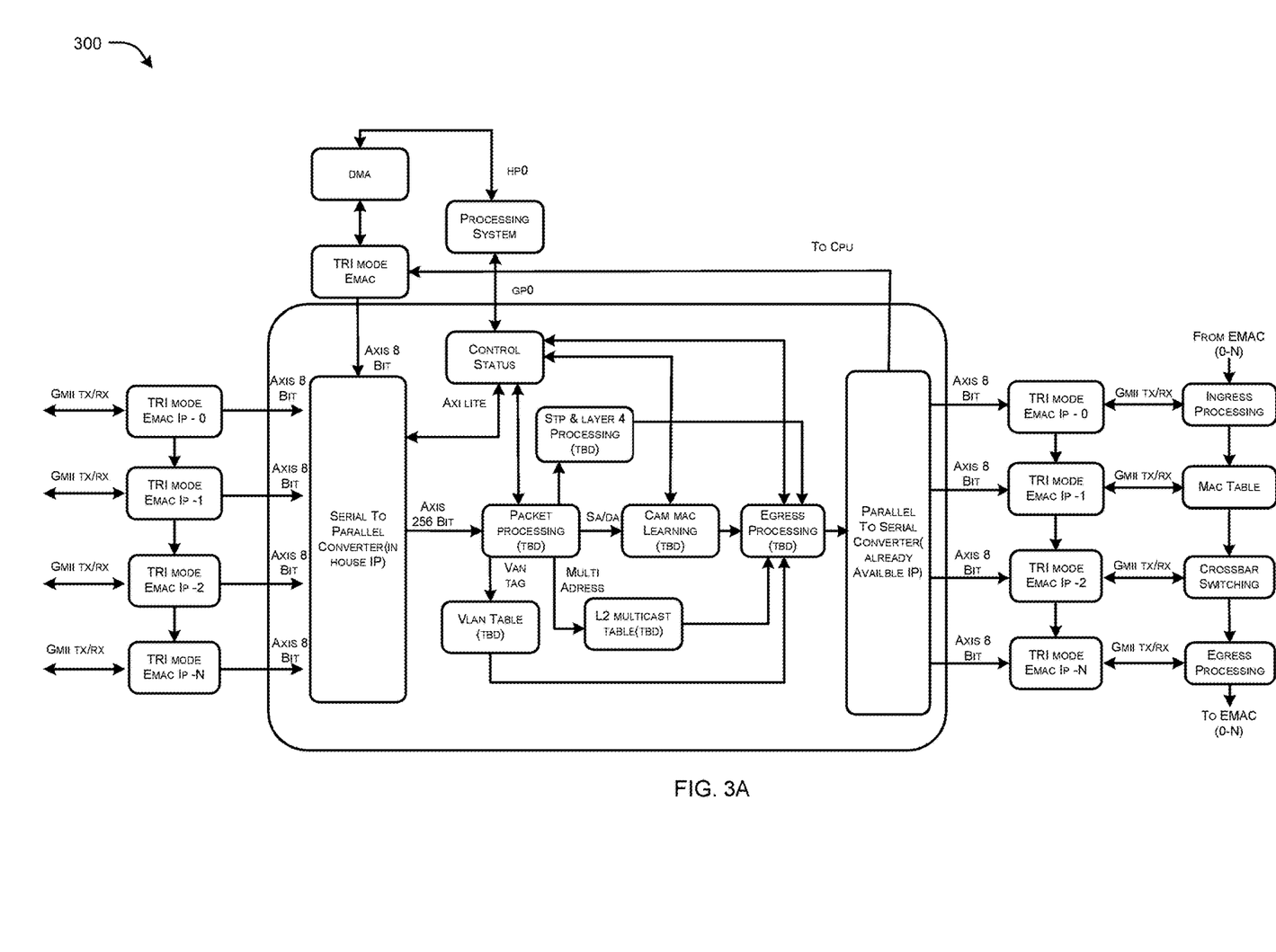
FIG. 3A-3E illustrate exemplary flow diagram (300) of the Source of the proposed system (100) for secure transfer of completely encrypted data at wire speeds, in accordance with an embodiment of the present disclosure.

In an illustrative embodiment of FIG. 3A the system for secure transfer of completely encrypted data at wire speeds may be implemented on a Field Programmable Gate Array. The Field Programmable Gate Array (FPGA) may pertain to one or more platforms manufactured by Intel (Altera), AMD (Xilinx), Microchip and the likes. The system can also be implemented on customized integrated circuits pertaining to one or more applications of small and large scale. The Source of the system may have 8-24 communication interfaces operable at 10/100/1000 Mbps speeds and extendable by an additional 4 10 Gbps on Xilinx MPSoC. L2 and L3 Ethernet communication may be accomplished by a network device, configured to be implemented by a router or a Switch module accommodated in the one or more processors (202) (as shown in FIG. 2). The AI processing engine may also be operated by the Switch module.

Figure 3B:
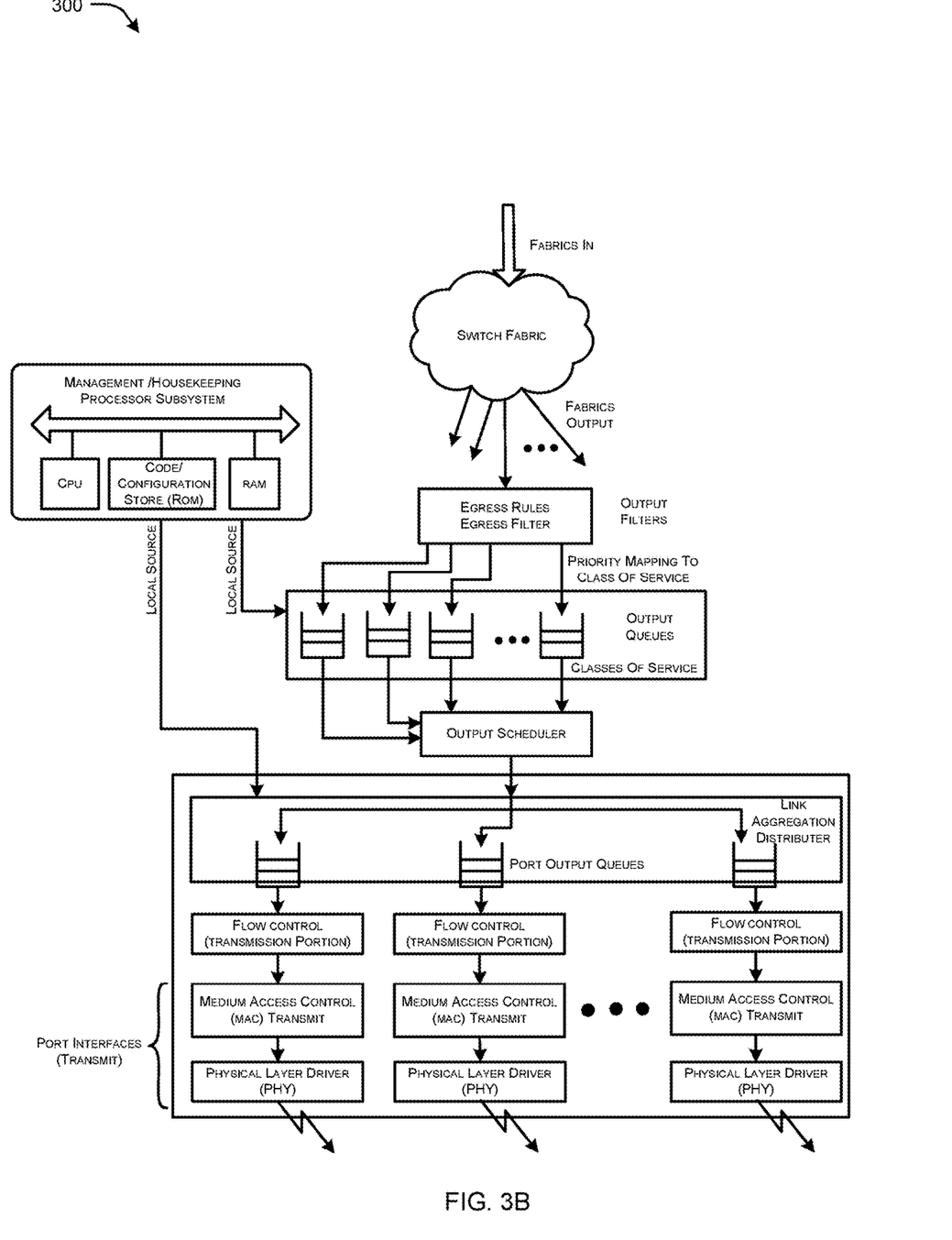

In an illustrative embodiment of FIG. 3B, an exemplary egress processing for transmitting completely encrypted information may be implemented by the one or more processors (202) (as shown in FIG. 2). Upon generation of the fourth set of data packets, the output port register is checked ot determine if the corresponding fourth set of data packet is enabled ot be forwarded or discarded. Priority for the transmission of the fourth set of data packets is set. The egress VLAN operations are performed by the Egress VLAN Register and the Egress port filter rule is applied for the each of the output vector. The third set of data packets pertaining to the fourth set of transmitted data packet may be stored in the key-register that may be communicated as part of the previous packet to one or more Destinations. Location of the next decrypting key may also be included in the transmitted fourth set of data packets. Tables may be configured to store values for decrypting keys transmitted as part of the fourth set of data packets, location of future keys for encryption and decryption and also a pseudo MAC address for every source and destination to uniquely identify the one or more Destinations (108) communicatively coupled to one or more communication network.

Figure 3C:
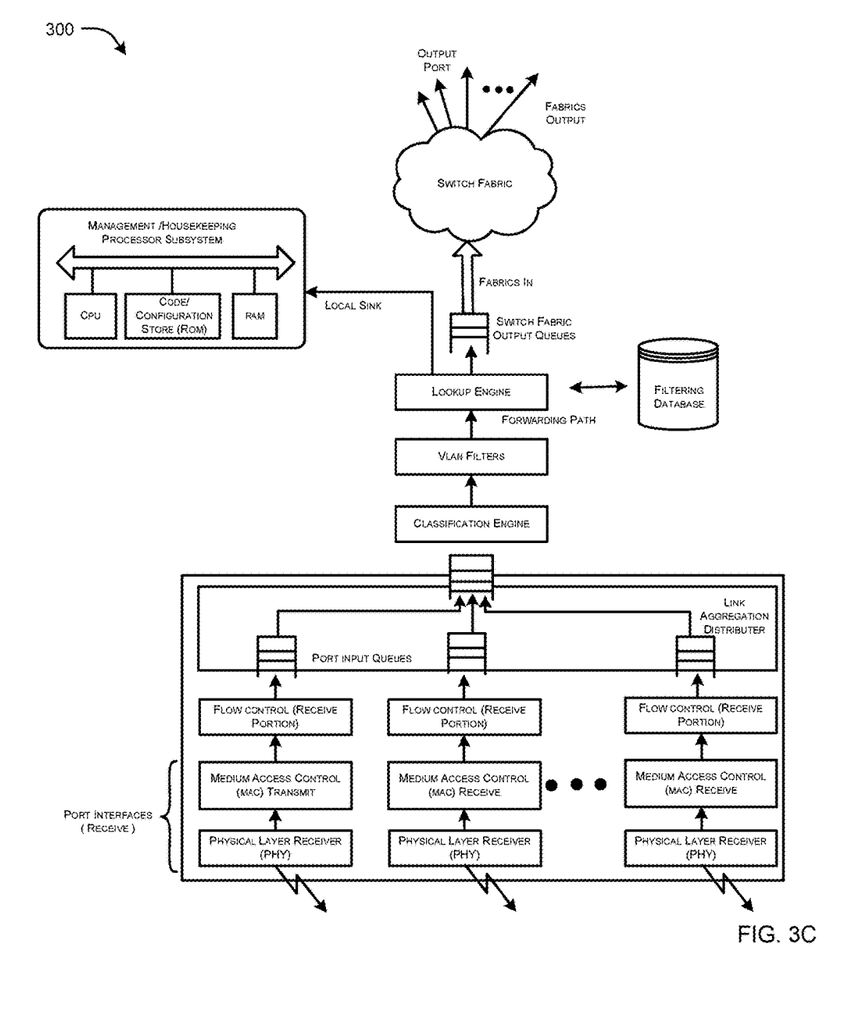

In an illustrative embodiment of FIG. 3C operations related to ingress processing may be implemented by the one or more processors. The steps related ot ingress processing may include locating the decrypting key in a preset_key-_register. The seventh set of data packet extracted from the received fifth set of data packets may be searched based on location determined from preset_location. Both the registers may be updated with the location of the decrypting key for decrypting the subsequent second set of data packet and the third set of data packet associated with the next fourth set of data packets. Designated location registers may be specified for every EMAC interface enabled to be determined from these registers. There may be individual registers for every MAC Address associated with the one or more Destinations. The processing functions may include any or a combination of steps pertaining to determination of encryption status, presence of MAC address on the MAC table, extraction of source, destination and VLAN ID from the received fifth set of data packets, ingress filter status and the likes.

In an embodiment, upon detection of reserved destination MAC address, functionalities of reserved mac operation register may be performed. By way of example, if the information is intended for broadcast, it may be forwarded to all ports of VLAN members. If the information is configured for BPDU address (DA=BPDU) or rapid spanning tree protocol or to the CPU Mac address, the information may be transmitted to CPU port register. VLAN Id of the information may be selected based on Source port VLAN table register. VLAN ID may be selected from the source port VLAN table register or from the incoming data packet. In absence of detection of VID, default VID 1 may be selected. Further VLAN operations may be performed in predetermined sequence by the one or more processors, the operations pertaining to addition, removal, swapping of information and the likes.

In an embodiment, information received through EMAC-port is processed based on Destination address. The Destination Address of the received EMAC frame may be compared with CPU MAC address. Upon detection of a match an Encoder-module may be configured to rearrange the information and transmit it to the one or more processors. If it does not match, then the MAC learning module may be configured to take a decision and correspondingly forward the information to predetermined destinations.

Figure 3D:
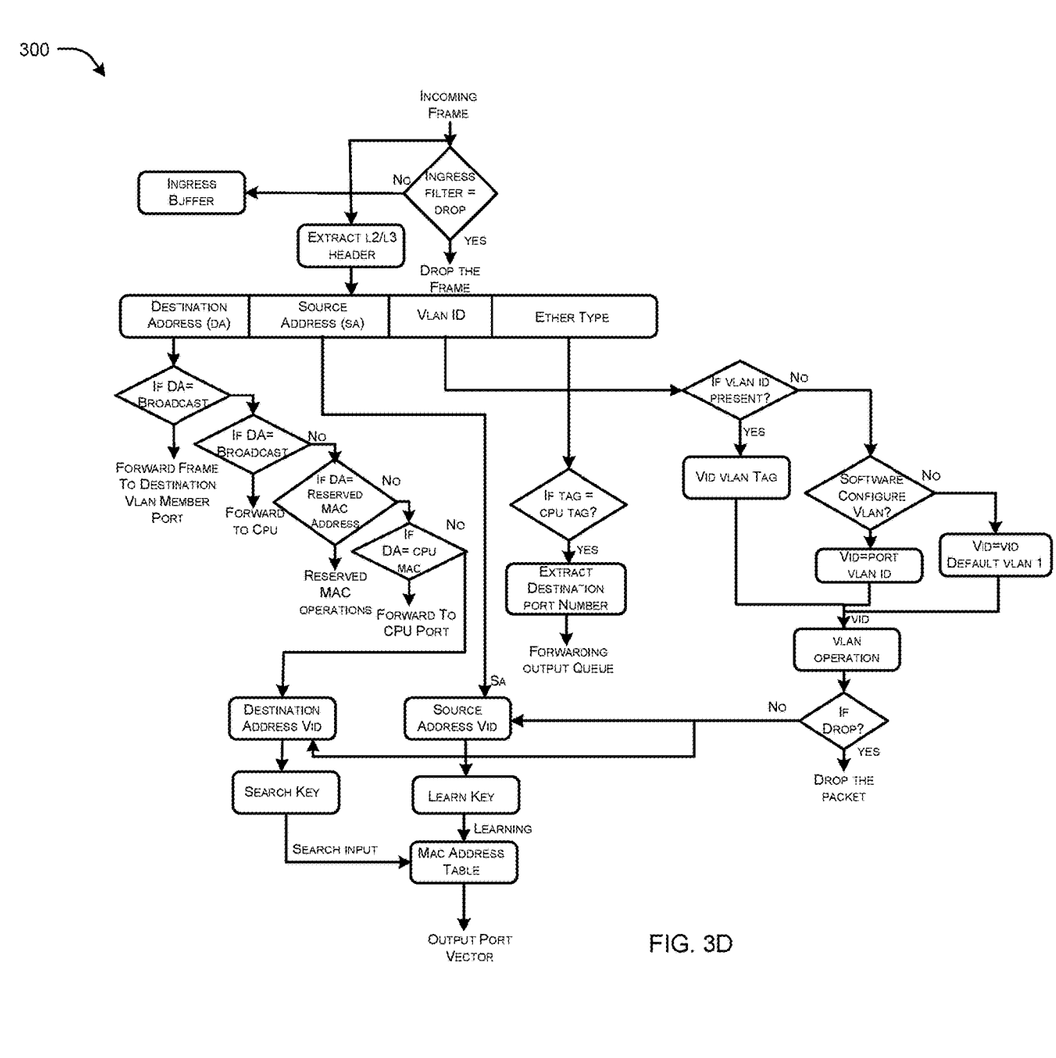
Figure 3E:
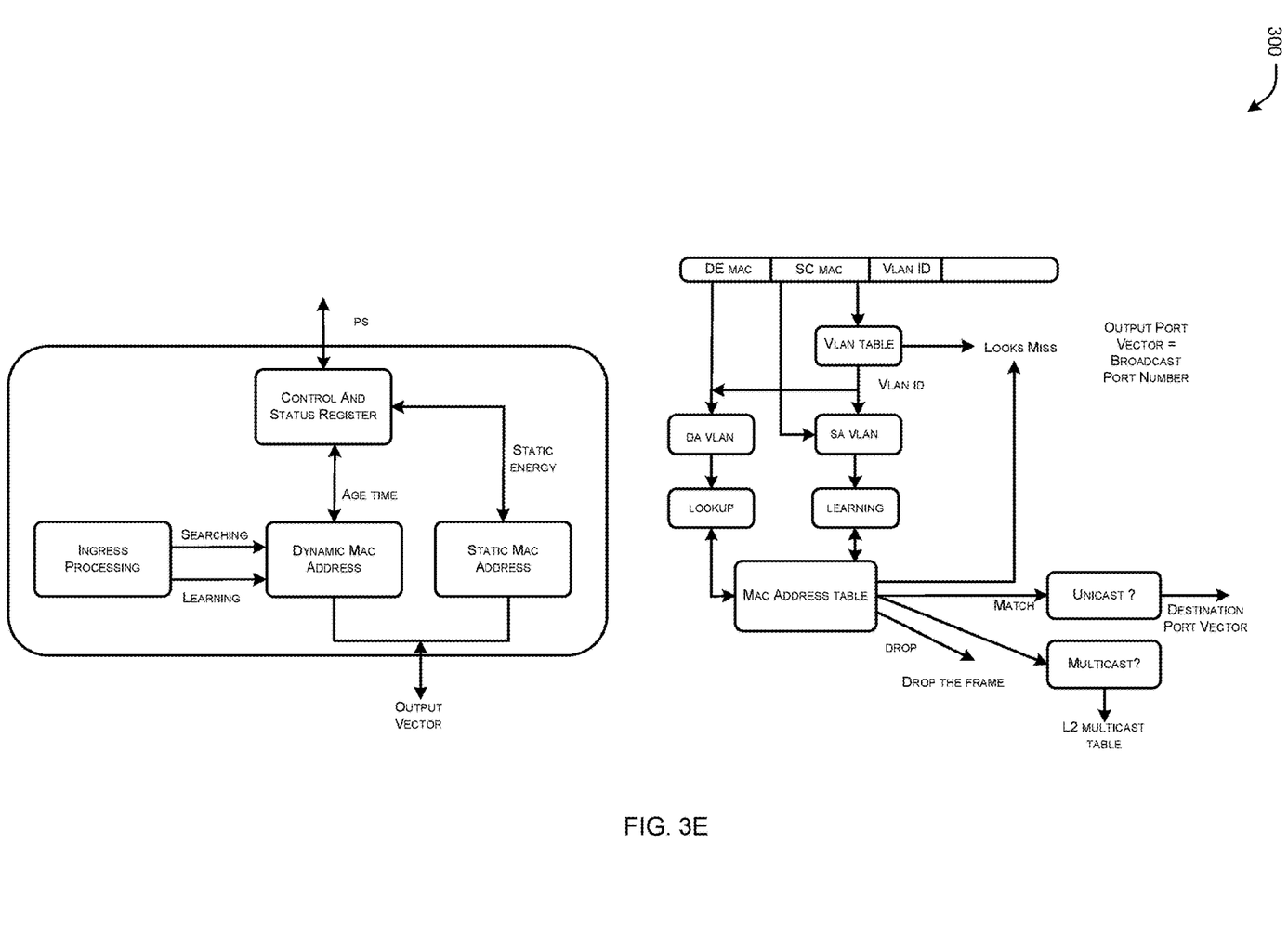

In an illustrative embodiment of FIG. 3D-3Es the steps to process the MAC Address may include extraction of destination address from the Ethernet frame received. The VLAN ID may be assigned based on the rules set by the software Source port VLAN register: The VLAN table may be used ot determine the VLAN ID. The VLAN ID and DA address are compared in the CAM table. If the Match is found inside the table, the matching address may be checked for multicast or unicast. Multicast address may be learned only when Multicast address learning bit is configured to be high in Source port VLAN register. In absence of a match, the frame may be broadcasted to all VLAN member ports. If the entry in the Dynamic MAC address table is not found, the output port may be static MAC address table followed by providing full configuration control of the Static MAC address table. Learning and aging may be enabled or disabled on individual port by setting learning-and-aging register for the port. In an embodiment of FIG. 3E, high level functional blocks of the MAC Address handling may be implemented by the one or more processors.

Figure 4A:
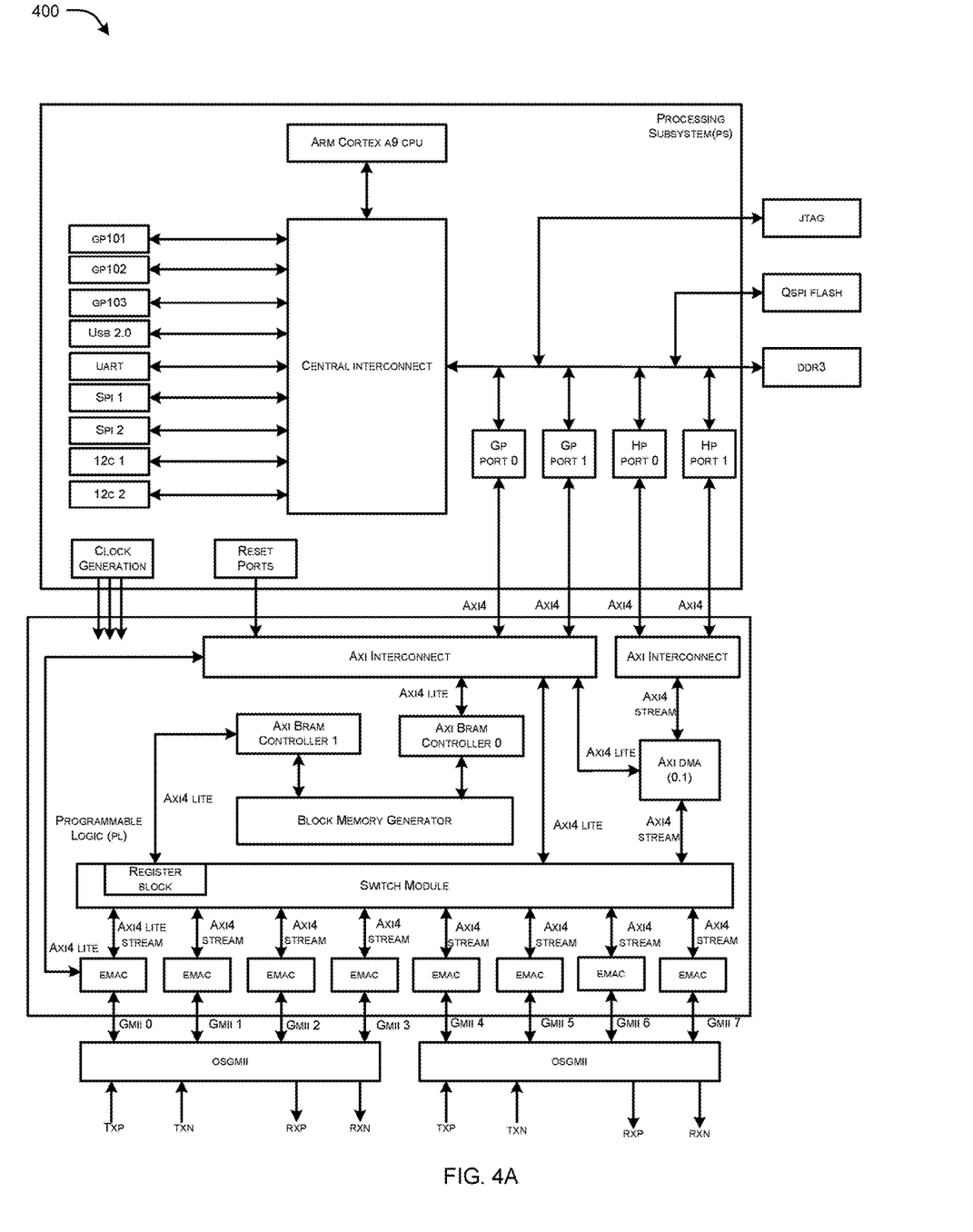
FIG. 4A-B illustrate exemplary views (300) of the proposed system (100) for secure transfer of completely encrypted data at wire speeds, in accordance with an embodiment of the present disclosure.
Figure 4B:
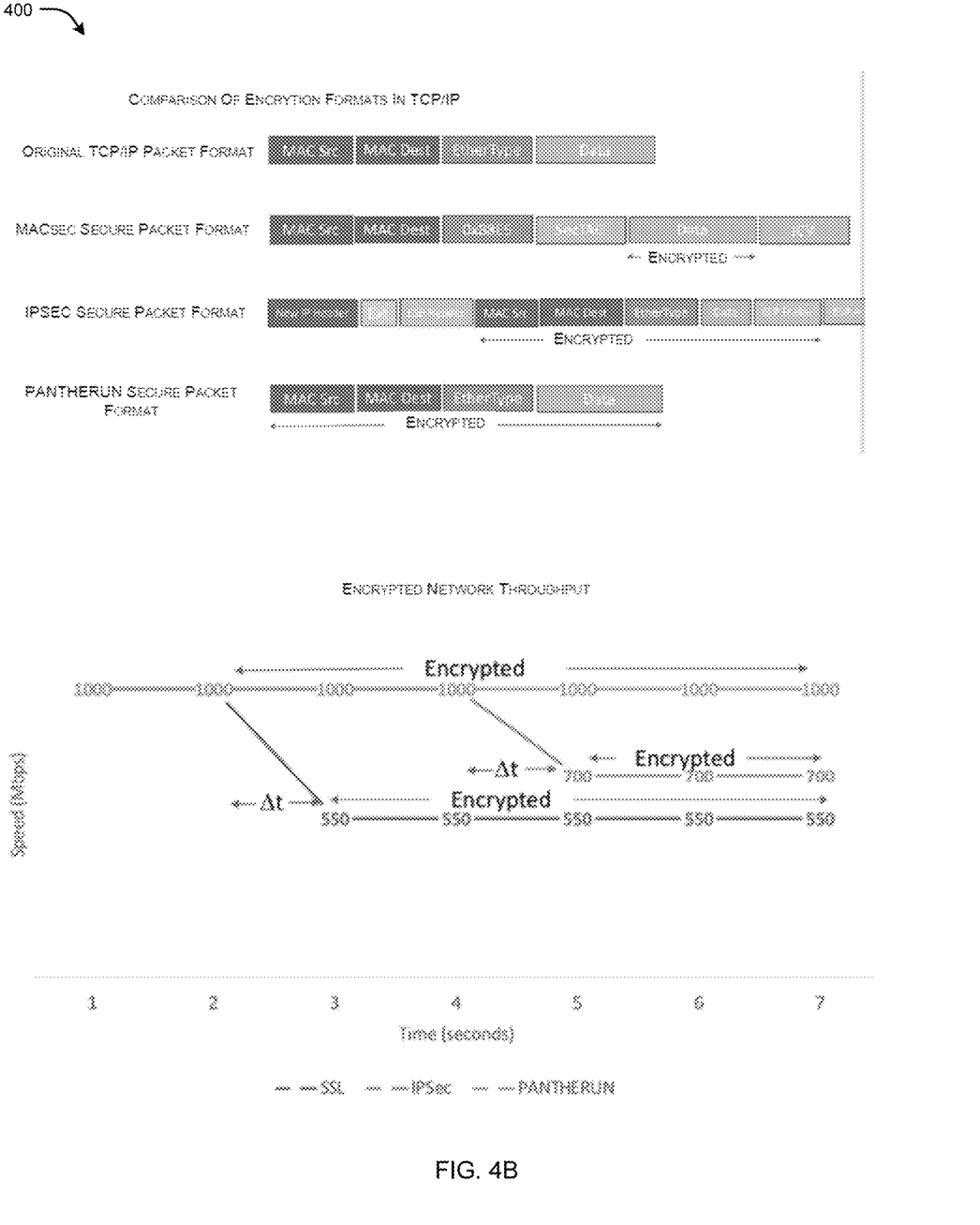

FIG. 4A-B illustrate exemplary views (400) of the proposed system (100) for secure transfer of completely encrypted data at wire speeds, in accordance with an embodiment of the present disclosure.

In an embodiment in FIG. 4A-4B, data flow within the switch module or the 30 router associated with the one or more processors may be utilized to implement the functionalities corresponding ot transmission/reception of completely encrypted information. The Field Programmable Gate Array (FPGA) may pertain ot one or more platforms manufactured by Intel (Altera), AMD (Xilinx), Microchip and the likes. The system can also be implemented on customized integrated circuits pertaining to one or more applications of small and large scale. The Source of the system may have 8-24 communication interfaces operable at 10/100/1000 Mbps speeds and additional 4 10 Gbps ports on Xilinx MPSoC. L2 and L3 Ethernet communication may be accomplished by a network device, configured to be implemented by a router or a Switch module accommodated in the one or more processors. The AI processing engine may also be operated by the Switch module.

In an exemplary embodiment, the completely encrypted information may pertain to standard TCP/IP format that may be indistinguishable from unencrypted information. Any device enabled to access TCP/IP packets, may be configured to use the proposed system and method. Artificial intelligence may be used to hide the decrypting key randomly within the transmitted information, thus making the proposed system secure from unauthorized access. The transmission of completely encrypted information may be implemented at wire speed, without a drop in speed from predetermined value due to the process of encryption and decryption. The entire message including the header and sensitive information may be encrypted.

Figure 5:
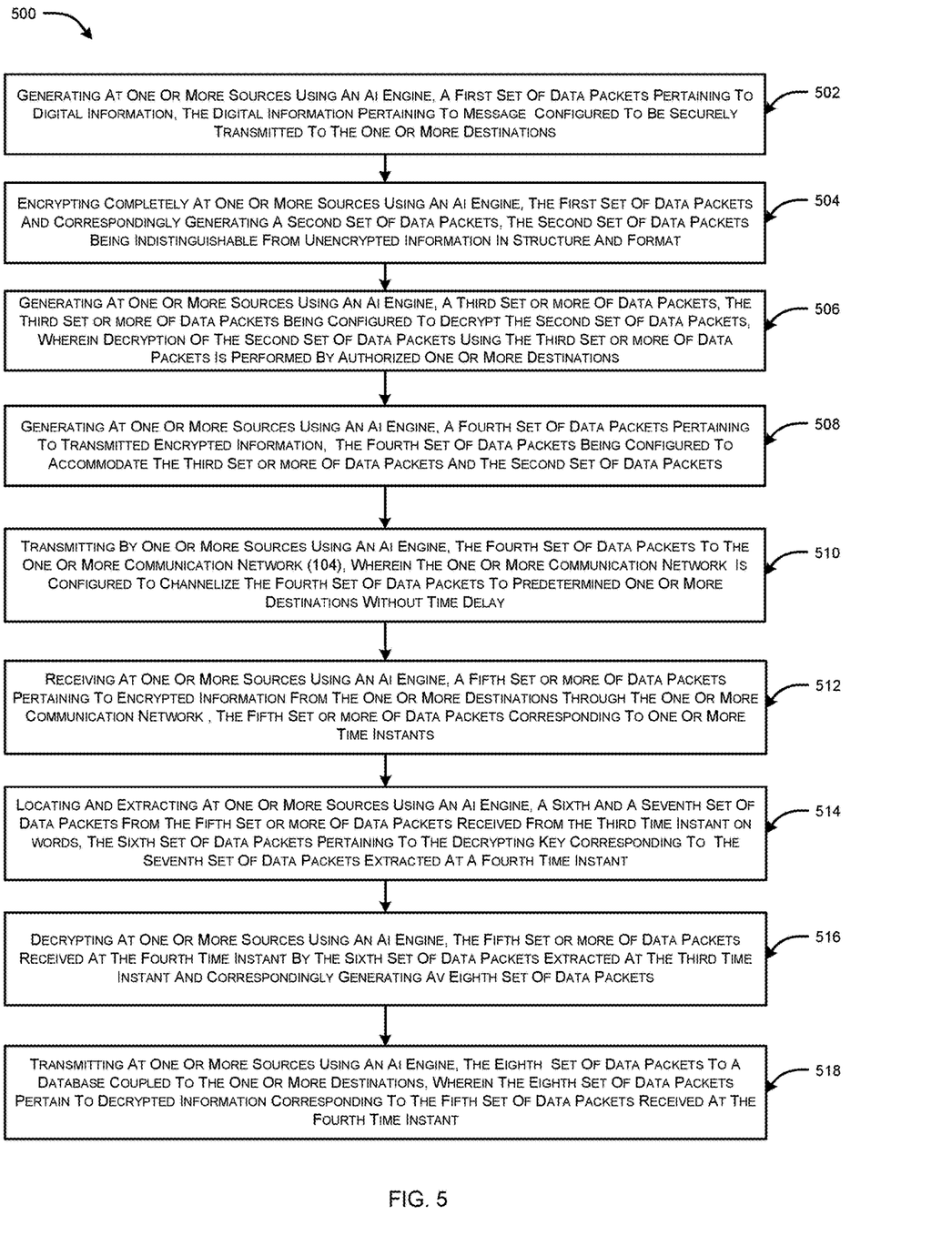
FIG. 5 illustrates exemplary functional steps of the proposed method (500) for secure transfer of completely encrypted data at wire speeds, in accordance with an embodiment of the present disclosure.

FIG. 5 illustrates exemplary functional steps of the proposed method (500) for secure transfer of completely encrypted data at wire speeds, in accordance with an embodiment of the present disclosure.

In an exemplary embodiment, the method (500) for secure transfer of completely encrypted data at wire speeds (interchangeably known as the method (500), herein) may include a step (502) of generating at one or more processors (202) using an AI engine, a first set of data packets pertaining to digital information. The digital information may pertain to a message configured to be securely transmitted to the one or more Destinations (108) and one or more servers (106) from the Source (102).

In an embodiment, the method (500) may include a step (504) of encrypting completely at one or more processors (202) using an AI engine, the first set of data packets and correspondingly generating a second set of data packets, the second set of data packets being indistinguishable from unencrypted information in structure and format.

In an embodiment, the method (500) may include a step (506) of generating at one or more processors (202) using an AI engine, a third or more set of data packets, the third or more set of data packets being configured to decrypt the second set of data packets. Decryption of the second set of data packets using the third or more set of data packets may be performed by authorized one or more Destinations (108).

In an embodiment, the method (500) may include a step (508) of generating at one or more processors (202) using an AI engine, a fourth set of data packets pertaining to transmitted encrypted information, the fourth set of data packets being configured to accommodate the third or more set of data packets and the second set of data packets in a predetermined sequence and at one or more time instants.

In an embodiment, the method (500) may include a step (510) of transmitting by one or more processors (202) using an AI engine, the fourth set of data packets to the one or more communication network (104), the one or more communication network (104) being configured to channelize the fourth set of data packets to predetermined one or more Destinations (108) without time delay.

In an embodiment, the method (500) may include a step (512) of receiving at one or more processors (202) using an AI engine, a fifth or more set of data packets pertaining to encrypted information from the one or more Destinations (108) through the one or more communication network (104), the fifth or more set of data packets corresponding to one or more time instants.

In an exemplary embodiment, the method (500) may include a step (514) of locating and extracting at one or more processors (202) using an AI engine, a sixth and a seventh set of data packets from the fifth or more set of data packets received at from the third time instant onwards, the sixth set of data packets pertaining to the decrypting key corresponding to the seventh set of data packets extracted at a fourth time instant. The third time instant is followed by the fourth time instant.

In an embodiment, the method (500) may include a step (516) of decrypting at one or more processors (202) using an AI engine, the seventh set of data packets configured to be extracted from the fifth set of data packets at the fourth time instant by the sixth set of data packets extracted from the fifth set of data packets at the third time instant. The one or more processors (202) of the Source (102) may correspondingly generate an eighth set of data packets corresponding to the unencrypted original message contained on the fifth set of data packets at the fourth time instant.

In an embodiment, the method (500) may include a step (518) of transmitting by one or more processors (202) using an AI engine, the eighth set of data packets to a database coupled to the one or more processors (202), the eighth set of data packets pertaining to decrypted information corresponding to the fifth set of data packets received at the fourth time instant.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

The terms, descriptions and figures used herein are set forth by way of illustration only. Many variations are possible within the spirit and scope of the subject matter, which is intended to be defined by the following claims and their equivalents in which all terms are meant in their broadest reasonable sense unless otherwise indicated.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides for a system and method that enables secure transfer of completely encrypted data at wire speeds including a header by a Source at wire speed.

The present disclosure provides for a system and method for secure transfer of completely encrypted data at wire speed that communicatively couples the Source to one or more Destinations through one or more communication networks.

The present disclosure provides for a system and method for secure transfer of completely encrypted data at wire speeds that enables the Source to transmit and receive the completely encrypted information at predetermined speed to and from one or more Destinations associated with authorized one or more users and one or more servers.

The present disclosure provides for a system and method for secure transfer of completely encrypted data at wire speeds that enables the Source to accommodate the decryption key in the encrypted information, the decrypting key being configured to decipher the encrypted message.

The present disclosure provides for a system and method for secure transfer of completely encrypted data at wire speeds that enables the Source to randomly assign one or more predetermined locations in the encrypted message for accommodating the decrypting key.

The present disclosure provides for a system and method for secure transfer of completely encrypted data at wire speeds that enables the Source to configure the encrypted message in standard TCP/IP format corresponding to L2/L3 layers of open system interconnection, the structure of encrypted information being indistinguishable from unencrypted information.

The present disclosure provides for a system and method for secure transfer of completely encrypted data at wire speeds that enables the Source to bi-directionally exchange encrypted information with the one or more communication networks (104) through any or a combination of serial and parallel interfaces.

I claim:

1. A system for secure transfer of completely encrypted data, the system comprising:
   a processing unit, communicatively coupled to one or more user devices associated with one or more users through a communication network, wherein the processing unit comprises one or more processors associated with a memory, the memory storing instructions executed by the one or more processors to:
   generate, a first set of data packets pertaining to digital information, wherein the digital information pertains to a message configured to be securely transmitted to the one or more user devices;
   encrypt completely the first set of data packets and correspondingly generate a second set of data packets, the second set of data packets being in encrypted form and indistinguishable from unencrypted information in structure and format of standard Transmission Control Protocol/Internet Protocol (TCP/IP);
   generate, a third or more set of data packets, the third or more set of data packets being configured to decrypt the second set of data packets, wherein decryption of the second set of data packets using the third or more set of data packets is performed by authorized one or more user devices;
   generate, a fourth set of data packets pertaining to transmitted encrypted information, the fourth set of data packets being configured to accommodate the third or more set of data packets and the second set of data packets, wherein the third or more set of data packets are placed in the fourth set of data packets at predetermined locations, wherein the predetermined locations are randomly generated by the one or more processors, and wherein the predetermined locations pertain to one or more time instants and one or more user devices;
   transmit, the fourth set of data packets to the communication network, wherein the communication network is configured to channelize the fourth set of data packets to predetermined one or more user devices without time delay;
   receive at the one or more processors, a fifth or more set of data packets pertaining to encrypted information from the one or more user devices through the communication network, the fifth or more set of data packets corresponding to the one or more time instants;
   locate and extract at the one or more processors, a sixth and a seventh set of data packets from the fifth or more set of data packets received from a third time instant onwards, the sixth set of data packets pertaining to a decrypting key corresponding to the seventh set of data packets extracted at a fourth time instant;
   decrypt at the one or more processors, the fifth or more set of data packets received at the fourth time instant by the sixth set of data packets extracted at the third time instant and correspondingly generating an eighth set of data packets; and
   transmit at the one or more processors, the eighth set of data packets to a database coupled to the one or more processors, wherein the eighth set of data packets pertain to decrypted information corresponding to the fifth or more set of data packets received at the fourth time instant.

2. The system as claimed in claim 1, wherein the system is configured to be used by any or a combination of completely encrypted and unencrypted information, wherein the completely encrypted information pertaining to the fourth set of data packets transmitted by the one or more processors is indistinguishable from the unencrypted first set of data packets, and wherein the first set of data packets are compatible with the standard TCP/IP protocol.

3. The system as claimed in claim 1, wherein the third or more set of data packets contained in the fourth set of data packets transmitted by the one or more processors at a first time instant corresponds to the decrypting key for the second set of data packets transmitted at a second time instant, and wherein the first time instant is followed by the second time instant.

4. The system as claimed in claim 1, wherein the sixth set of data packets contained in the fifth or more set of data packets received by the one or more processors from the third time instant onwards corresponds to the decrypting key for the seventh set of data packets extracted at the fourth time instant, and wherein the third time instant is followed by the fourth time instant.

5. The system as claimed in claim 1, wherein the fourth and the fifth or more set of data packets pertain to completely encrypted information transmitted/received by the one or more processors at the one or more time instants, and wherein the fourth and the fifth or more set of data packets pertain to L2 and L3 layer of communication of an open system interconnection model of the standard TCP/IP.

6. The system as claimed in claim 1, wherein the processing unit is enabled to transmit/receive completely encrypted information in any or a combination of serial and parallel communication interfaces, and wherein, information transfer through the parallel communication interfaces pertain to predetermined speed.

7. A method for facilitating secure transfer of completely encrypted data, the method comprising steps of:
  generating at one or more processors, a first set of data packets pertaining to digital information, wherein the digital information pertains to a message configured to be securely transmitted to one or more user devices;
  encrypting at the one or more processors, completely the first set of data packets and correspondingly generate a second set of data packets, the second set of data packets being in encrypted form and indistinguishable from unencrypted information in structure and format of standard Transmission Control Protocol/Internet Protocol (TCP/IP);
  generating at the one or more processors, a third or more set of data packets, the third or more set of data packets being configured to decrypt the second set of data packets, wherein decryption of the second set of data packets using the third or more set of data packets is performed by authorized one or more user devices;
  generating at the one or more processors, a fourth set of data packets pertaining to transmitted encrypted information, the fourth set of data packets being configured to accommodate the third or more set of data packets and the second set of data packets, wherein the third or more set of data packets are placed in the fourth set of data packets at predetermined locations, wherein the predetermined locations are randomly generated by the one or more processors, and wherein the predetermined locations pertain to one or more time instants and one or more user devices;
  transmitting by the one or more processors, the fourth set of data packets to a communication network, wherein the communication network is configured to channelize the fourth set of data packets to predetermined one or more user devices without time delay;
  receiving at the one or more processors, a fifth or more set of data packets pertaining to encrypted information from the one or more user devices through the communication network, the fifth or more set of data packets corresponding to the one or more time instants;
  locating and extracting at the one or more processors, a sixth and a seventh set of data packets from the fifth or more set of data packets received from a third time instant onwards, the sixth set of data packets pertaining to a decrypting key corresponding to the seventh set of data packets extracted at a fourth time instant;
  decrypting at the one or more processors, the fifth or more set of data packets received at the fourth time instant by the sixth set of data packets extracted at the third time instant and correspondingly generating an eighth set of data packets; and
  transmitting at the one or more processors, the eighth set of data packets to a database coupled to the one or more processors, wherein the eighth set of data packets pertain to decrypted information corresponding to the fifth or more set of data packets received at the fourth time instant.

* * * * *